United States Patent [19]

Marx

[11] 4,225,261

[45] Sep. 30, 1980

[54] BALL SOCKET ASSEMBLY WITH RESILIENT LOCKING KEY

[75] Inventor: Thomas O. Marx, Rockton, Ill.

[73] Assignee: Atwood Vacuum Machine Company, Rockford, Ill.

[21] Appl. No.: 11,759

[22] Filed: Feb. 12, 1979

[51] Int. Cl.³ .................. F16C 11/00; F16D 1/12
[52] U.S. Cl. ............................... 403/122; 403/135; 403/357; 403/319; 403/353; 280/513; 29/149.5 B; 29/434
[58] Field of Search ............ 403/122, 133, 135, 136, 403/141, 143, 147, 319, 353, 355, 357; 29/149.5 B; 280/509, 510, 511, 513

[56] References Cited

U.S. PATENT DOCUMENTS 2,047,885  7/1936  Riebe .................. 29/149.5 B
3,773,358  11/1973  Butler et al. .................. 280/513

Primary Examiner—Wayne L. Shedd
Attorney, Agent, or Firm—Leydig, Voit, Osann, Mayer & Holt Ltd.

[57] ABSTRACT

A ball socket assembly having a ball received in a socket member to swivel relative to the latter with the ball initially inserted into a first end portion of an elongated slot in the socket member and then shifted to the second end portion of the slot. A flange is formed on the socket member at the opening of the slot generally around the second end portion thereof to retain the ball in the socket member and a wedge is slidable in the socket member across the first end of the slot to assume an active position in which it holds the ball in the second end portion of the slot. A lip on the wedge engages the ball and holds the wedge in the active position.

5 Claims, 9 Drawing Figures

U.S. Patent  Sep. 30, 1980  Sheet 1 of 2  4,225,261
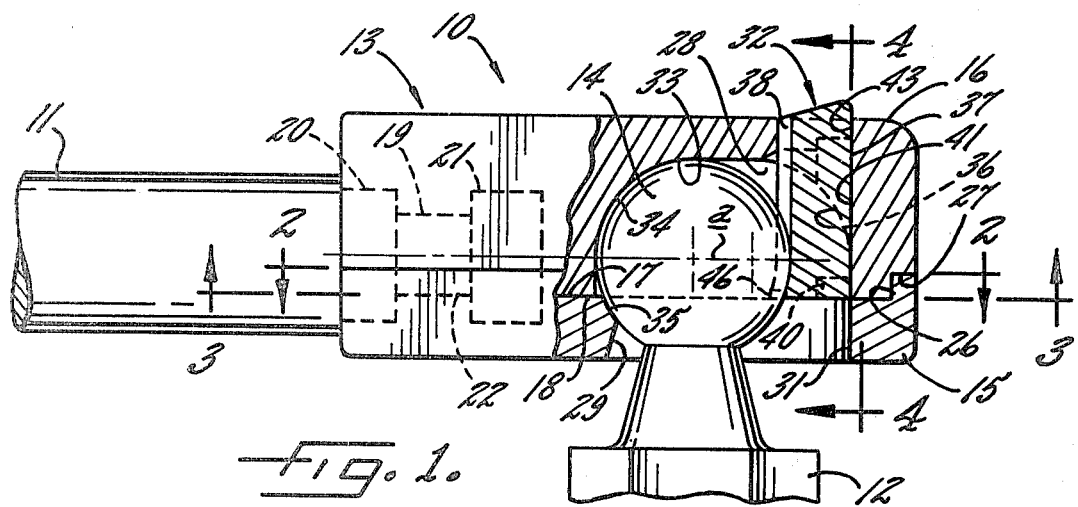
fig. 1.
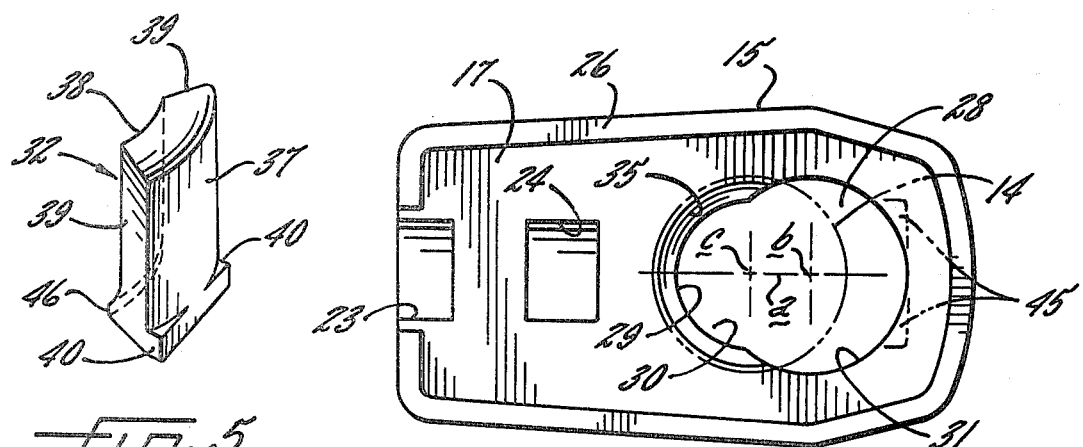
fig. 5.
fig. 2.
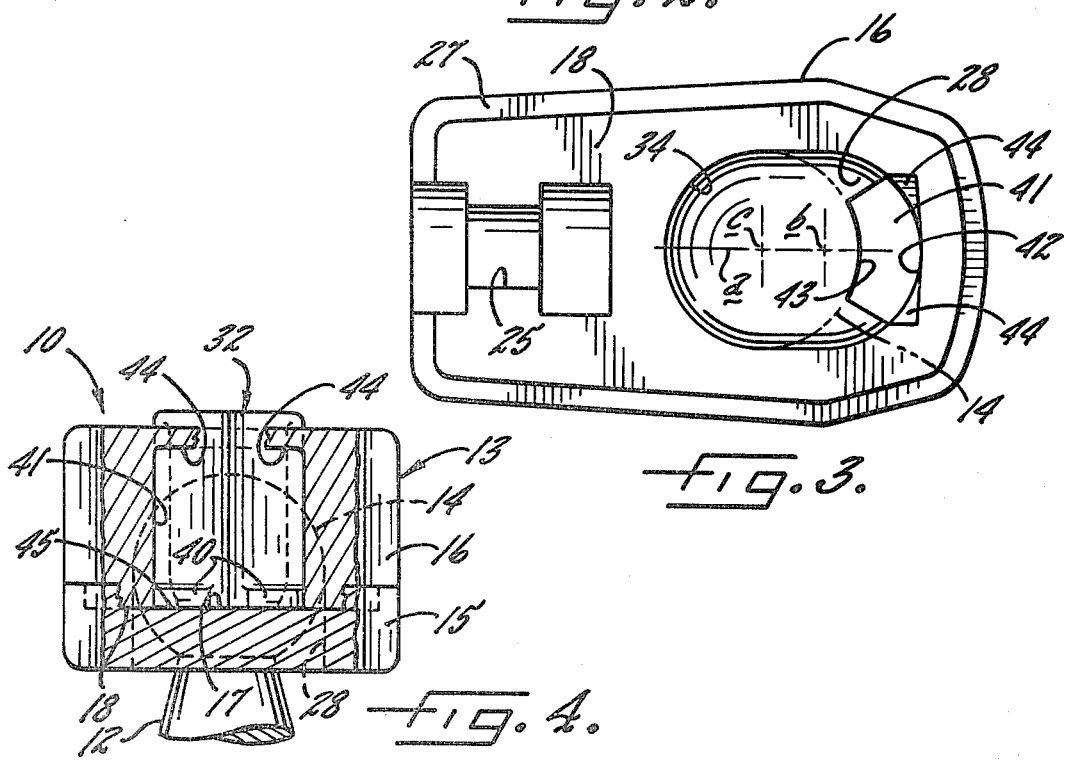
fig. 3.
fig. 4.

BALL SOCKET ASSEMBLY WITH RESILIENT LOCKING KEY

BACKGROUND OF THE INVENTION

This invention relates to a ball socket assembly used to connect two parts, usually rods, so that the parts may swivel relative to each other and, more particularly, to an asembly in which a ball is mounted on one part and received in a recess formed in a socket member which is mounted on the other part. In many instances, the part with the socket member is shipped as one unit and the part with the ball is shipped as a separate unit and the ball and the socket member are assembled by the customer. A clip or wedge then is used to hold the ball and the socket member in the assembled position.

In prior assemblies of this type, various difficulties have been encountered. For example, the clip results in the socket member having a comparatively weak portion which breaks in service use. In other assemblies, the clip may become disassociated with the socket member during shipping or handling or the clip may break as the ball and socket member are assembled. Moreover, the assembly procedure and particularly the manipulation of the clip or wedge has been relatively tedious.

SUMMARY OF THE INVENTION

The general object of the invention is to provide a new and improved ball socket assembly of the foregoing type which is constructed so that the ball may easily be assembled with the socket member, so that there is little chance of parts breaking during assembly or of parts being lost, and so that the ball is securely held in place while the chance of failure of the assembly during service use is materially reduced.

A more detailed object is to accomplish the foregoing by forming the recess in the socket member as an elongated slot with the ball being inserted in the first end portion of the slot and shifted to the second end portion where it is retained in the socket member by a flange extending around the second end portion and by using a clip or wedge which slides across the first end portion to hold the ball in the second end portion.

The invention also resides in the novel construction of the clip or wedge whereby the latter is captivated on the socket member before the ball is inserted into the slot and also is maintained in position across the first end portion of the slot after the ball and socket member have been assembled.

BRIEF DESCRIPTION OF THE DRAWINGS

FIG. 1 is a fragmentary side elevational view of a swivel connection utilizing a ball socket assembly which embodies the present invention, parts being broken away and shown in section.

FIG. 2 is a sectional view taken along the line 2—2 in FIG. 1, the ball being shown in broken lines.

FIG. 3 is a sectional view taken along the line 3—3 in FIG. 1, the ball being shown in broken lines and the clip not shown.

FIG. 4 is a sectional view taken along the line 4—4 in FIG. 1.

FIG. 5 is a perspective view of the clip.

DETAILED DESCRIPTION OF THE PREFERRED EMBODIMENT

Figure 6:
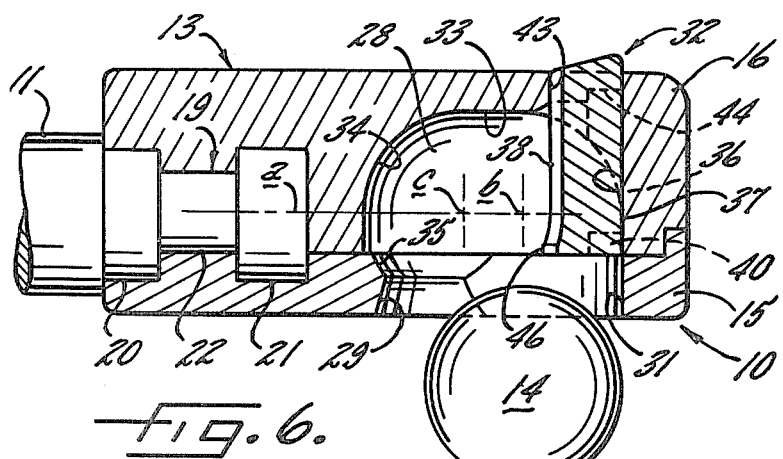
FIG. 6 is a sectional view generally similar to FIG. 1 and showing the parts in position to be assembled.

As shown in the drwaings for purposes of illustration, the invention is embodied in a ball socket assembly 10 which provides a swivel connection between one rod 11 and a second rod 12. A socket member 13 is mounted rigidly on the rod 11 and receives a ball 14 formed integrally on the end of the rod 12 so that the ball may swivel in the socket member. Preferably, the socket member is molded from a rigid plastic such as nylon and herein is molded in two parts 15 and 16. The latter are made with generally flat abutting faces 17 and 18 respectively which, when the parts are connected to the rod 11, are joined together as by bonding, ultrasonic welding or the like.

To connect the socket member 13 to the rod 11, the end portion 19 of the rod is reduced in diameter and given a spool shape with larger ends 20 and 21 and an intermediate spindle 22. At the parting face 17, the part 18 is formed with spaced recesses 23 and 24 (FIG. 2) which receive the spool ends 20 and 21 and a slot 25 (FIG. 3) in the face 18 of the part 16 receives the spool ends and the spindle 22. Thus, when the parts 15 and 16 are placed over the end portion 9 of the rod 11 with the parts of the spool-like end portion in the recesses 23 and 24 and the slot 25, the faces 17 and 18 of the socket member parts are joined and the member thereby is mounted on the rod 11. At its outer periphery, the part 15 is formed with a narrow flange 26 (FIGS. 1 and 2) which is received in a complementary recess 27 (FIGS. 1 and 3) in the periphery of the part 16 to maintain the proper orientation of the parts 15 and 16 relative to each other, especially as they are being joined together. Beyond the end portion 19 of the rod, the socket member 13 is formed with a recess 28 and the ball 14 on the end of the rod 12 is inserted in this recess to complete the swivel connection.

Figure 7:
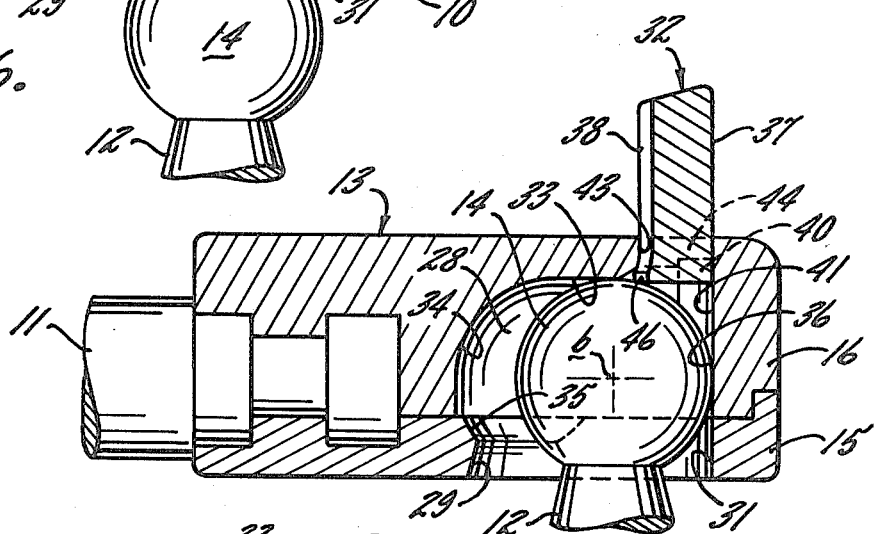
FIG. 7 is a sectional view similar to FIG. 6 with the first step of assembly completed.
Figure 8:
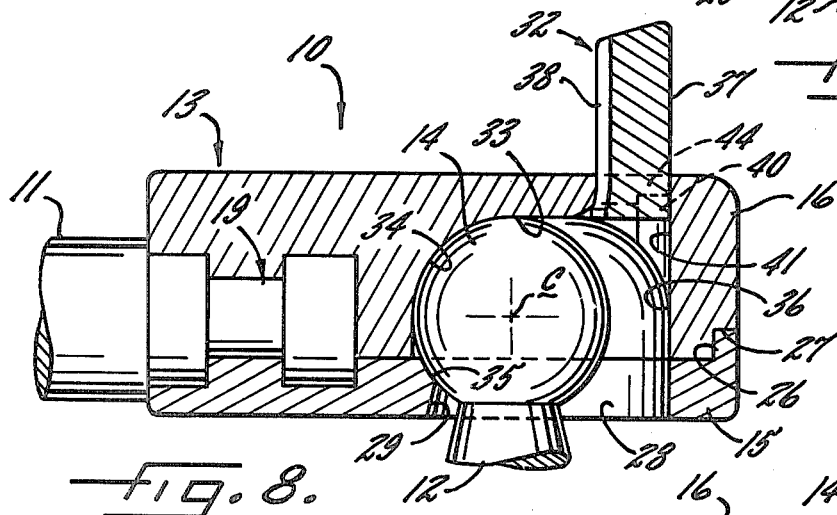
FIG. 8 is a sectional view similar to FIG. 6 with the second step of assembly completed.
Figure 9:
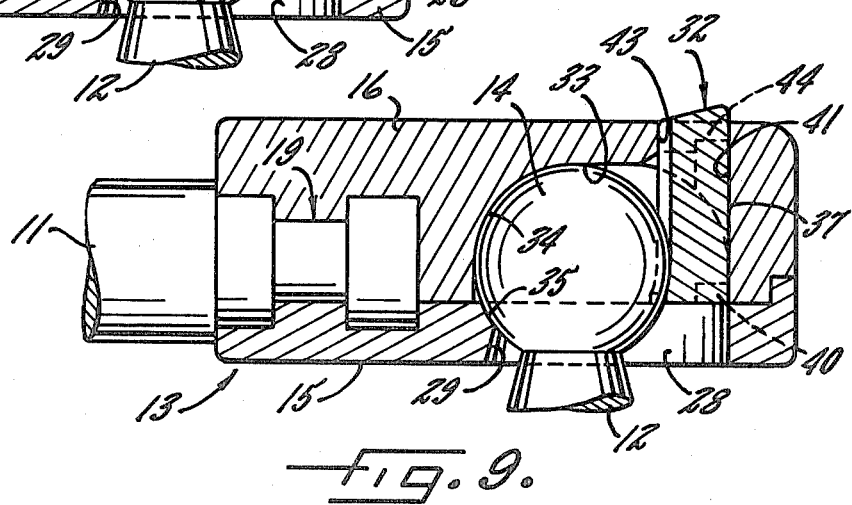
FIG. 9 is a sectional view similar to FIG. 6 with the final step of assembly completed.

In accordance with the present invention, the ball socket assembly 10 is constructed and arranged in a novel manner so that the ball 14 may easily be inserted in the recess 28, so that there is little chance of parts breaking when the ball is inserted or of parts being lost prior to or during insertion, and so that the ball is securely held in place while the chance of failure of the assembly during service use is materially reduced. To these ends, the recess 28 is elongated and a flange 29 (see FIG. 2) is formed around one end portion of the opening 30 of the recess to give the opening a keyhold shape. The ball 14 first is inserted into the recess 28 through the larger end 31 of the keyhole opening 30 as shown in FIG. 7 and then the ball is shifted to the other end of the slot above the flange 29 (see FIG. 8). Thereafter, a clip or wedge 32 which is slidable in the socket member 13 is moved into its locking position (see FIGS. 1 and 9) to hold the ball 14 under the flange 29. The wedge 32 is constructed to coact with the socket member and the ball in a novel manner so that wedge is captivated in the socket member both before the ball is inserted and after the wedge is moved to the locking position. Moreover, the wedge is arranged so that it automatically is moved out of the way as the ball 14 initially is inserted into the recess 28 and then is easily moved into the locking position.

In the present instance, the recess 28 is a slot coaxial with and elongated in the direction of the rod 11 and the flange 29 extends around the opening 30 of the slot at the end near the rod 11 and along the adjacent sides of the slot. The inner or bottom wall 33 of the slot is generally semi-circular in cross section with its radius generally the same as the radius of the ball and the centerline a of the radius of the wall is the axial centerline of the rod 11. The end wall 34 of the slot 28 is partially spherical in shape to mate with the ball and the end wall 34 merges with the bottom wall 33, In addition, the inner side 35 of the flange 29 is concave so that this side and the walls 33 and 34 coact to form the basic portion of a spherical socket for the ball 14. When the ball first is inserted in the slot, the center of the ball is at the point b and, when the ball is against the end wall 34, the center is at the point c, both points being on the centerline a.

An important aspect of the invention resides in the construction of the clip or wedge 32 and its cooperation with the socket member 13 and the ball 14. The wedge is disposed in the socket member adjacent the far end wall 36 of the slot 28, the wall 36 having the same general curvature as the other end wall 34, and the wedge is mounted to slide in the socket member transversely of the centerline a. The wedge also is molded from a relatively rigid plastic material such as nylon and is basically a rectangular block. As shown most clearly in FIGS. 1, 3 and 5, the outer side 37 of the wedge is slightly convex and the inner side 38 is convex with the radius of curvature of the inner side being generally equal to the radius of the ball 14. The side walls 39 of the wedge are inclined inwardly from the outer wall 37 to the inner wall 38. At its lower end portion, the wedge is straight on the outer side to form two ears 40 at the sides of the convex wall 37.

The wedge 32 slides in a groove 41 formed in the part 16 of the socket member 13 adjacent the end wall 36 of the slot 28 and the groove opens into the end of the slot adjacent this end wall. The groove 41 extends transversely of the centerline a and the outer wall 42 of the groove is flat (see FIG. 3) to accommodate the sliding of the ears 40. At its upper end as viewed in FIG. 1, the groove communicates with an opening 43 in the part 16 and this opening is shaped to conform to the shapes of the convex and concave walls 37 and 38 and the inclined side walls 39 of the wedge. Thus, the opening 43 leaves two abutments 44 (FIGS. 3 and 6) which are engaged by the ears 40 when the wedge is slid to its most projected position illustrated in FIG. 7. Engagement of the abutments by the ears prevents the wedge from escaping from the socket member 13 through the opening 43. When the wedge is in its operative position as shown in FIGS. 1-4 and 9, the ears 40 abut areas 45 (FIGS. 2 and 4) at the edge of the larger part of the opening 31 of the recess 28 and this prevents the wedge from leaving the socket member when the wedge is moved in the opposite direction. In this way, the wedge is captivated at all times in the socket member 13.

At its lower end, the wedge 32 is formed with a lip 46 which projects inwardly from the inner concave wall 38 of the wedge. The lip is somewhat flexible so that, after the ball 14 is located in the slot 28 against the end wall 34 and the wedge is pushed from its projected position to its active or assembled position, the lip flexes to pass the ball and then snaps in under the ball. With the parts thus assembled, the wedge holds the ball against the end wall 34 where the flange 29 holds the ball in the socket member 13 while permitting the parts to swivel relative to each other and, at the same time, the lip 46 holds the wedge in place and against movement toward its projected position.

The manner of connecting the ball 14 and the socket member 13 and the advantages of the present invention may best be understood with reference to FIGS. 6 through 9. Usually, the rod 11 with the socket member attached is shipped as one unit while the rod 12 with the ball is shipped as a separate unit and the customer assembles the two to form the swivel connection. Because the wedge 32 slides rather loosely in the groove 41, the wedge may be seated at the bottom of the groove 41 with the ears 40 resting on the socket member part 15 as shown in FIG. 6, the ball there being shown in place to be inserted into the slot 28 through the larger portion 31 of the keyhole opening 30 to the slot. It is not necessary, however, to first move the wedge to its projected position because the ball automatically engages the wedge and pushes it to the projected position as the ball enters the slot 28, that is, as the ball is moved from the position illustrated in FIG. 6 to that shown in FIG. 7. Next, the ball is shifted laterally in the slot 28 toward the end of the rod 11 (see FIG. 8) so that the ball is against the end wall 34 and the flange 29 underlies the ball to hold the latter in the slot. Finally, the wedge is pushed in until the lip 46 also underlies the ball, the lip flexing to pass the ball, and, in this condition, the parts are fully assembled with the ball and wedge held in place while the ball is free to swivel in the socket member. When the parts are fully assembled, the wedge does not interfere with the structural integrity of the socket member and thus the possibility of the entire assembly failing during service use is greatly reduced.

I claim:

1. A ball socket assembly providing a swivel connection between first and second parts, said assembly comprising a socket member rigidly connected to said first part and a ball of predetermined radius rigidly connected to said second part, said socket member having an elongated slot opening outwardly on one side of the socket member and formed with a bottom wall generally semi-circular in cross section, the cross section of said bottom wall having a radius substantially the same as the radius of said ball, said slot being longer than said radius and having a first end portion receiving said ball and a second end portion communicating with said first end portion, a flange formed on said socket member at the opening of said slot and extending along said first end portion thereof to captivate said ball whereby the opening of said slot has generally the shape of a keyhole with the wide part of the opening at said second end portion and the narrow part of the opening at said first end portion, a clip mounted in said socket member in said second end portion of said slot and slidable in said socket member transversely of said slot between an inactive position and an active position, said clip when in said active position engaging and confining said ball to hold the ball in the first end portion of said slot and captivated by said flange, and a resilient lip formed on said clip to flex and pass said ball as said clip is moved from said inactive position to said active position and operable in said active position to overlap the ball and engage the latter whereby engagement of the lip and the ball holds the clip against sliding in said socket member and the clip holds the ball in said first end portion of the slot.

2. A ball socket assembly providing a swivel connection between first and second parts, said assembly comprising a socket member rigidly connected to said first part and a ball of predetermined radius rigidly connected to said second part, said socket member having an elongated slot opening outwardly on one side of the socket member and formed with a bottom wall generally semi-circular in cross section, the cross section of said bottom wall having a radius substantially the same as the radius of said ball, said slot being longer than said radius and having a first end portion receiving said ball and a second end portion communicating with said first end portion, a flange formed on said socket member at the opening of said slot and extending along said first end portion thereof to captivate said ball whereby the opening of said slot has generally the shape of a keyhole with the wide part of the opening at said second end portion and the narrow part of the opening at said first end portion, an elongated groove formed in said socket member adjacent said second end portion of said slot, said groove opening into and extending transversely of said slot and further opening through said socket member beyond said bottom wall, a clip slidably mounted in said groove to slide between an inactive position in which it projects out of said member and an active position in which it engages and confines said ball to hold the ball in the first end portion of said slot and captivated by said flange, and a resilient lip formed on said clip to flex and pass said ball as said clip is moved from said inactive position to said active position and operable in said active position to overlap the ball and engage the latter whereby engagement of the lip and the ball holds the clip against sliding in said socket member and the clip holds the ball in said first end portion of the slot.

3. A ball socket assembly as defined by claim 2 in which said clip has a concave surface engaging said ball.

4. A ball socket assembly as defined by claim 3 including ears formed on said clip and abutment surfaces formed on socket member adjacent each end of said groove, said abutment surfaces being engageable to said ears to limit sliding of said clip in each direction.

5. A ball socket assembly providing a swivel connection between first and second parts, said assembly comprising a socket member rigidly connected to said first part and a ball of predetermined radius rigidly connected to said second part, said socket member having an elongated slot opening outwardly on one side of the socket member and formed with a bottom wall semi-circular in cross section, the cross section of said bottom wall having a radius substantially the same as the radius of said ball, said slot being longer than said radius and having a first end portion receiving said ball and a second end portion communicating with said first end portion, a flange formed on said socket member at the opening of said slot and extending along said first end portion and the adjacent end thereof to captivate said ball whereby the opening of said slot has the shape of a keyhole with the wide part of the opening at said second end portion and the narrow part of the opening at said first end position, an elongated groove formed in said socket member adjacent said second end portion of said slot and opening through said member beyond said bottom wall, said groove also opening into and extending transversely of said slot, a wedge slidable in said groove between an inactive position where it projects out of said member and an active position in which it engages said ball to hold the ball in the first end portion of said slot and captivated by said flange, a lip formed on said wedge and extending over said ball to engage the latter when the wedge is in said active position whereby engagement of the lip and the ball holds the wedge against sliding in said socket member and the wedge holds the ball in said first end portion of the slot, said lip being resilient to flex and pass said ball as said wedge is moved from said inactive position to said active position, said wedge having a concave surface engaging said ball, ears formed on said wedge, and abutment surfaces formed on said socket member adjacent each end of said groove and engageable by said ears to limit sliding of said wedge in each direction.

* * * * *